US005946171A

United States Patent [19]

Magnier

[11] Patent Number: 5,946,171
[45] Date of Patent: Aug. 31, 1999

[54] METHOD AND DEVICE FOR PREVENTION AGAINST EXPLOSION AND FIRE OF ELECTRICAL TRANSFORMERS

[76] Inventor: Philippe Magnier, 68, rue de Poissy, F-78100 Saint Germain en Laye, France

[21] Appl. No.: 08/836,929

[22] PCT Filed: Sep. 27, 1996

[86] PCT No.: PCT/FR96/01513

§ 371 Date: May 19, 1997

§ 102(e) Date: May 19, 1997

[87] PCT Pub. No.: WO97/12379

PCT Pub. Date: Apr. 3, 1997

[30] Foreign Application Priority Data

Sep. 28, 1995 [FR] France .................................. 95/11386

[51] Int. Cl.[6] ...................................................... H02H 7/00

[52] U.S. Cl. ............................... 361/37; 361/38; 361/115

[58] Field of Search .................................... 361/115, 103, 361/93, 18, 38, 37

[56] References Cited

U.S. PATENT DOCUMENTS 5,534,853 7/1996 Pioch ..................................... 340/646

FOREIGN PATENT DOCUMENTS 1355777 2/1963 France .
2624 882 12/1977 Germany .
0238475 9/1987 Germany ......................... A62C 3/12
94/28566 12/1994 WIPO ............................. H01H 9/50
97/12379 4/1997 WIPO ............................ H01F 27/14

OTHER PUBLICATIONS

Patent Abstracts of Japan JP5182838 published Jul. 23, 1993 for "Abnormality Monitoring Device of Oil–Immersed Electric Equipment", 1 sheet.
Dialog Web search results for English–language abstract for EPO 0238475 downloaded and printed Nov. 25, 1998, 1 sheet.
Dialog Web search results for English–language abstract for EPO 2624882A downloaded and printed Oct. 13, 1998, 1 sheet.

*Primary Examiner*—Jeffrey Gaffin
*Assistant Examiner*—Stephen Jackson
*Attorney, Agent, or Firm*—Conley, Rose & Tayon

[57] ABSTRACT

An electrical transformer which is filled with a combustible coolant may experience a break in the electrical insulation within the transformer. This break in the electrical insulation may lead to an explosion or fire. A pressure sensor and a vapor sensor are preferably coupled to the enclosure to monitor the pressure and vapor content of the enclosure. An increase in pressure of the enclosure may indicate that an insulation breakdown has occurred. When an increase in pressure is detected, the coolant is partially drained from the enclosure. After draining some of the coolant, an inert gas may be injected into the bottom of the enclosure to stir the remaining coolant.

32 Claims, 2 Drawing Sheets

Figure 1:
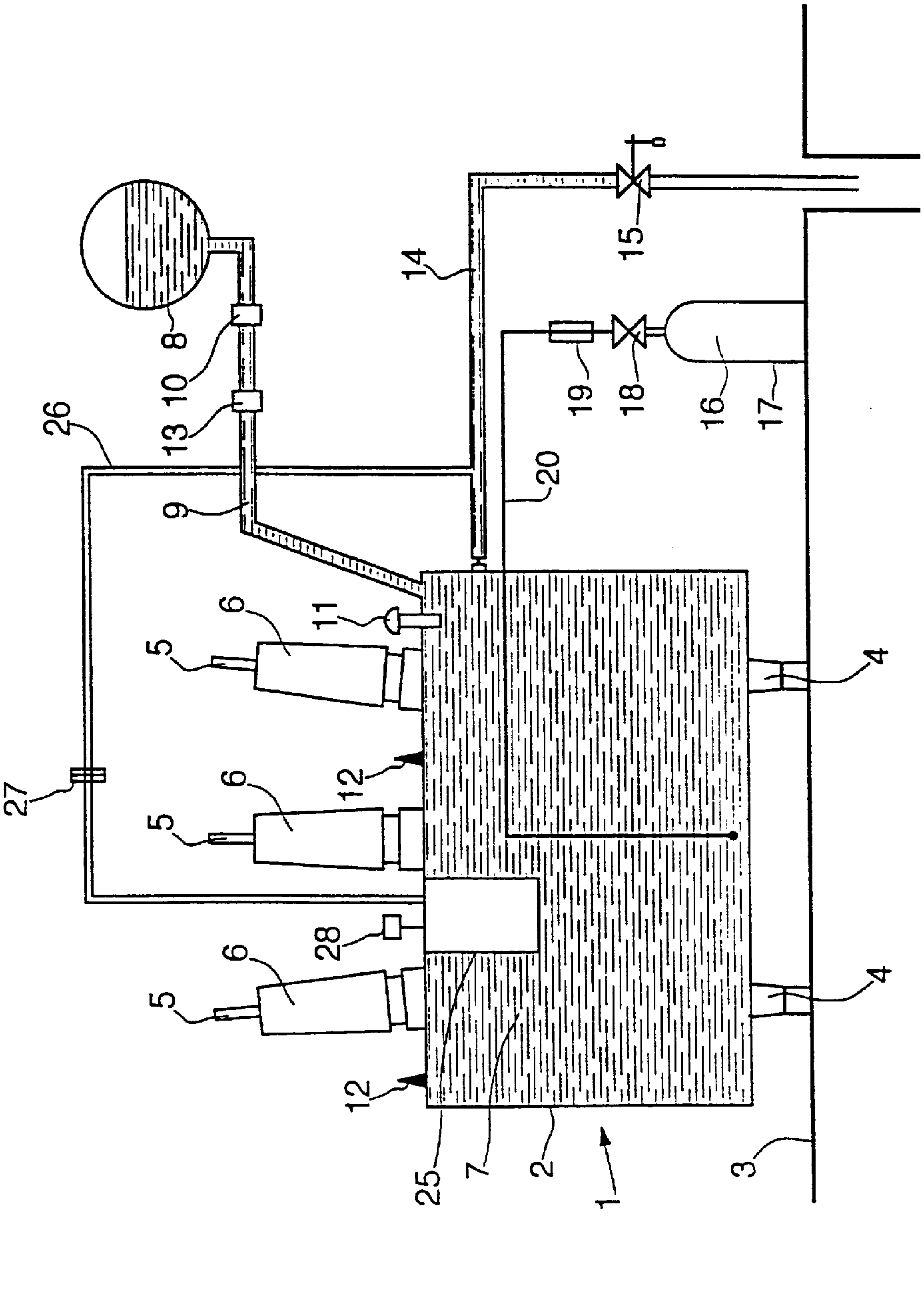

METHOD AND DEVICE FOR PREVENTION AGAINST EXPLOSION AND FIRE OF ELECTRICAL TRANSFORMERS

The present invention relates to the field of the prevention against explosion and fire of electrical transformers cooled by a combustible fluid.

Electrical transformers exhibit losses both in the windings and in the core, for which reason the heat produced needs to be dissipated. High-power transformers are thus generally cooled using oil. The oils used are dielectric and can ignite above a temperature of the order of 140°. Since transformers are very expensive components, particular attention must be paid to protecting them.

Fires in power transformers insulated by dielectric oil generally occur because of an internal electrical insulation break, causing an often very violent deflagration. This results in extensive rupture of the enclosure of the transformer and combustion of the oil which spreads the fire to other on-site equipment which may also contain large quantities of combustible products.

Explosions can be caused by overloads, voltage surges, progressive deterioration of the insulation, an insufficient oil level, the appearance of moisture or mould or the failure of an insulating component.

Safety valves, which trigger in the event of an overpressure within the enclosure of the transformer, are known in the prior art. However, these valves are not suited to the consequences of an internal insulation fault in the transformer.

Fire protection systems for electrical transformers are also known which are actuated by temperature detectors. However, these systems are implemented with a significant time lag, when the oil of the transformer is already burning. A compromise is then made to limit the combustion to the equipment in question, and to prevent the fire from spreading to the neighbouring plant.

The object of the present invention is therefore to provide a method which protects both against overpressure inside the transformer, due to deflagration when the internal electrical insulation breaks, and against the fire which results from such insulation breaks.

A further object of the invention is a device for prevention against explosion and fire, which allows immediate detection of the electrical insulation break.

According to the invention, the method of prevention against explosion and fire in an electrical transformer equipped with an enclosure filled with a combustible coolant, comprises the following steps:

- detecting a break in the electrical insulation of the transformer, using a pressure-sensor means,
- partial draining of the coolant contained in the enclosure, using a valve, and
- cooling the hot parts of the coolant by injecting a pressurized inert gas into the bottom of the enclosure in order to stir the coolant and flush the oxygen located in proximity.

According to the invention, the device for prevention against explosion and fire in an electrical transformer equipped with an enclosure filled with a combustible coolant comprises a means for sensing the pressure in the said enclosure and a means for partially draining the coolant contained in the enclosure.

An insulation fault firstly generates a strong electric arc which causes actuation of the electrical protection systems which trigger the supply cell of the transformer (circuit breaker) . The electric arc also causes resultant dissipation of energy, which generates an increase in the internal pressure of the transformer, sufficient to cause its enclosure to rupture.

The device for prevention against explosion and fire is preferably equipped with a means for detecting the triggering of the supply cell of the transformer, and with a control unit which receives the signals emitted by the sensor means of the transformer and can emit control signals.

The device for prevention against explosion and fire preferably comprises a means for cooling the hot parts of the fluid, by injecting inert gas into the bottom of the enclosure, which is controlled by a control signal from the control unit. The reason for this is that some parts of the coolant undergo heating which can cause them to ignite. Injecting an inert gas at the lower part of the enclosure causes stirring of the coolant, which equilibrates the temperature and makes it possible to flush the oxygen present in proximity to the fluid.

Figure 2:
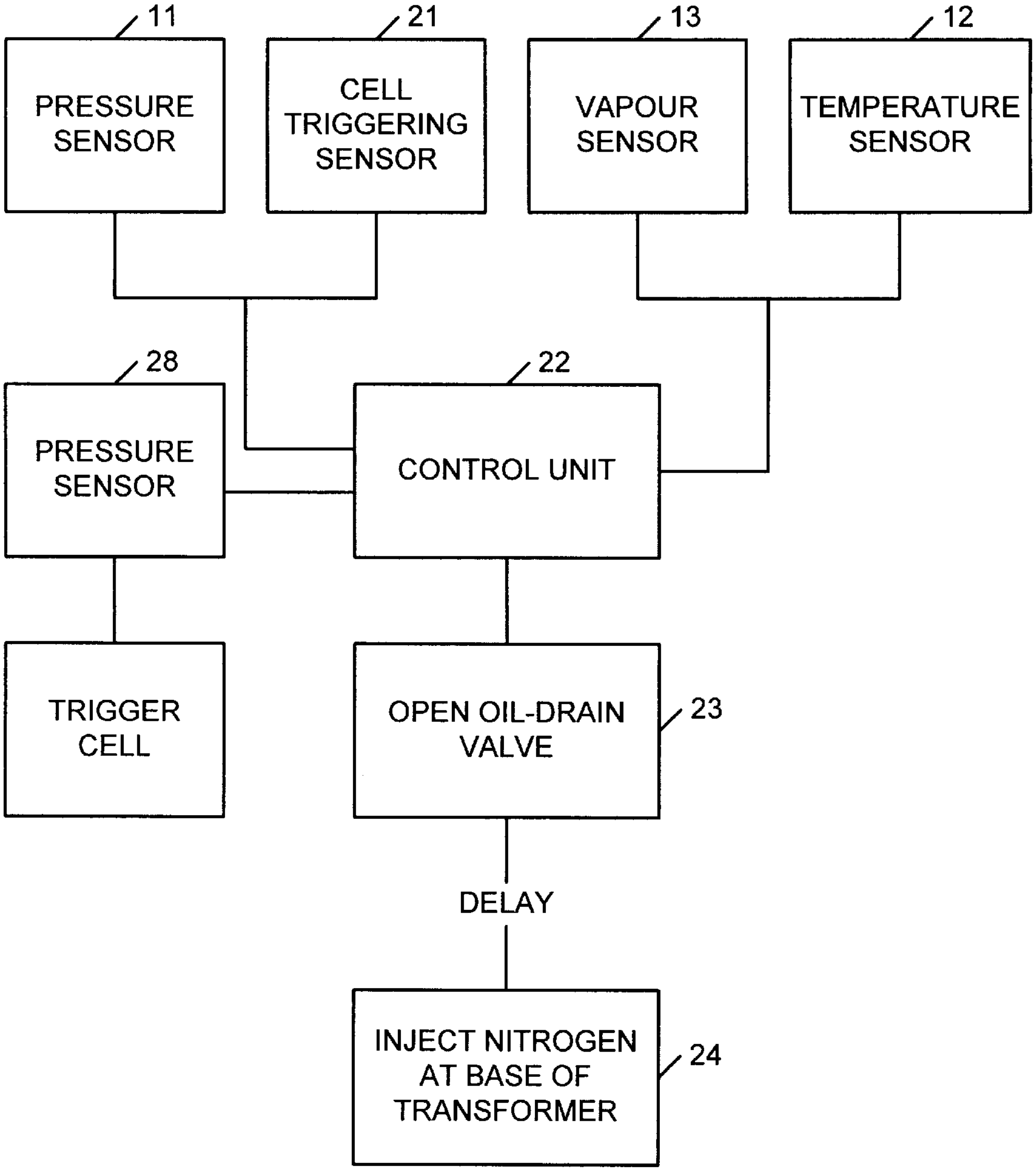

The invention will be understood more clearly on studying the detailed description of a particular embodiment, taken as an entirely non-limiting example and illustrated by the appended drawings, in which:

FIG. 1 is an overall view of the prevention device according to the invention; and FIG. 2 is a schematic view representing the logic of the operation of the device according to the invention.

As illustrated in the figures, the transformer 1 comprises an enclosure 2, resting on the floor 3 by means of feet 4, and is electrically supplied via wires 5 surrounded by insulators 6.

The enclosure 2 is filled with a coolant 7, for example dielectric oil. In order to guarantee a constant level of coolant 7 in the enclosure 2, the transformer 1 is equipped with a make-up tank 8 communicating with the enclosure 2 via a conduit 9.

The conduit 9 is provided with an automatic check valve 10 which closes off the conduit 9 as soon as it detects a rapid movement of the fluid 7. Thus, in the event of an explosion in the enclosure 2, the pressure in the conduit 9 drops abruptly, which causes fluid 7 to start to flow, and this is stopped rapidly by the closing of the automatic check valve 10. This prevents the fluid 7 contained in the make-up tank 8 from feeding the fire in the transformer 1.

The enclosure 2 is equipped with a pressure sensor 11 which can immediately detect the variation in pressure due to the deflagration caused by the break in the electrical insulation of the transformer 1. The pressure sensor 11 may, in particular, consist of a safety valve which is equipped with an electrical contact and is thus capable of transmitting information relating to the pressure variation detected. The enclosure 2 is also equipped with temperature sensors 12, located at several points in the enclosure 2, in order to ascertain the temperature of the fluid 7. However, these temperature sensors 12 have a delay estimated at 20 or 30 seconds relative to the pressure detector 11, because of the fact that heat propagates more slowly than pressure.

The enclosure 2 comprises a sensor 13 detecting the presence of coolant vapour, also referred to by the term buchholz, mounted at an upper point in the enclosure 2, in general on the conduit 9. The deflagration due to an electrical insulation break rapidly causes the release of vapour from the fluid 7 in the enclosure 2. A vapour sensor 13 is therefore highly expedient for detecting a break in the electrical insulation.

The transformer 1 is supplied via a supply cell (not shown) which comprises means for cutting off the supply, such as circuit breakers, and which is equipped with triggering sensors 21.

The enclosure 2 is equipped with drainage means, comprising a conduit 14 to which it is connected at the desired height of the drainage level. The conduit 14 is closed by a valve 15 with a large diameter, for example 100 to 150 mm. The enclosure 2 comprises a means for cooling the fluid 7 by injecting an inert gas 16, such as nitrogen, into the bottom of the enclosure 2. The inert gas 16 is stored in a pressurized tank 17 equipped with a valve 18, a pressure reliever 19 and a pipe 20 which conveys the gas 16 to the enclosure 2.

The pressure sensor 11, the temperature sensors 12, the vapour sensor 13, the triggering sensors 21, the valve 15 of the conduit 14 and the valve 18 of the pipe 20 are connected to a control unit 22 intended to control the operation of the device. The control unit 22 is equipped with data-processing means which receive the signals from the various sensors and can emit control signals intended for the valves 15 and 18.

The device is actuated by a high-pressure signal coming from the pressure sensor 11 coinciding with a triggering signal coming from the triggering sensors 21 of the supply cell of the transformer 1, in order to prevent explosion and fire. The device may also be actuated by a high-temperature signal coming from one of the temperature sensors 12 coinciding with a vapour-presence signal coming from the vapour sensor 13, in order to initiate the extinguishing of a fire. There is thus a requirement that two sensors supply concordant information, in order to avoid premature triggering.

Under normal conditions, the device is triggered by the high-pressure information in accordance with the information relating to the triggering of the supply cell, which immediately initiates the step 23 of opening the drainage valve 15, which allows immediate decompression of the enclosure 2 of the transformer 1, most of whose components will therefore remain intact, with the exception of those located in a region very close to the electric arc generated by the insulation fault. Opening the valve 15 makes it possible to avoid overflows of ignited fluid 7 when the inert gas 16 will be injected into the possibly damaged enclosure 2. Finally, opening the valve 15 causes decompression in the conduit 9, which leads to the automatic check valve 10 closing. The make-up tank 8 is thus isolated and the fluid 7 which it contains does not feed the fire. Opening the valve 15 quickly also reduces the risks of explosion and raises the probability that the enclosure 2 of the transformer 1 will remain intact.

The risks of fire are therefore reduced, but after partial draining of the enclosure 2, the step 24 of injecting the inert gas 16 into the bottom of the enclosure 2 is systematically initiated after a given time delay of, for example, 20 seconds, in order to stir the fluid 7 so as to equilibrate its temperature and also to suffocate any possible flames on the surface of the fluid 7 by flushing the oxygen. The reason for this is that the fluid 7, in general oil, can only ignite at a temperature above its flash-point, that is to say about 140°. Moreover, in the case of a fire in the transformer 1, due to an electric arc, only the surface of the fluid 7 reaches this value, whereas the average temperature is at most 80° C. Stirring the fluid 7 therefore makes it possible to reduce the temperature of the hottest parts. For safety reasons, the tank 17 containing the inert gas 16 is intended to be able to inject the inert gas 16 for a time lasting of the order of 45 minutes, which is much greater than the predicted time for extinguishing the fire.

The transformer 1 may be equipped with one or more on-load tap changers 25, used as interfaces between the said transformer 1 and the electrical network to which it is connected, in order to ensure a constant voltage in spite of the variations in the current delivered to the network. The on-load tap changer 25 is connected via a conduit 26 to the conduit 14 intended for drainage. The on-load tap changer 25 is actually also cooled by an inflammable coolant. Because of its small volume, the explosion of an on-load tap changer is extremely violent and may be accompanied by the spraying of jets of ignited coolant. The conduit 26 is provided with a calibrated diaphragm 27, capable of rupturing in the event of a short-circuit, and therefore of overpressure inside the on-load tap changer 25. This prevents the enclosure of the said on-load tap changer 25 from exploding. This changer also comprises a pressure sensor 28 which is connected, on the one hand, to the supply cell of the transformer 1 in order to trigger it and, on the other hand, to the control unit 22 in order to initiate operation of the prevention device in the event of a short-circuit in the on-load tap changer 25.

The invention thus provides a method and a device for prevention against explosion and fire in a transformer, which require few modifications to existing components, which detect insulation breaks extremely rapidly, and which act almost simultaneously so as to limit the resulting consequences. This allows both the transformer and the on-load tap changer to be safeguarded from loss, and also makes it possible to minimize the damage due to short-circuiting.

I claim:

1. A method for protecting an electrical transformer against explosion and fire, the electrical transformer comprising an enclosure filled with a combustible coolant, comprising:

detecting a break in the electrical insulation of the transformer using a pressure sensor;

partially draining the coolant contained in the enclosure using a valve, wherein the draining is performed substantially immediately after the pressure sensor detects a break in the electrical insulation of the transformer; and cooling at least a portion of the coolant by injecting a pressurized inert gas into the bottom of the enclosure in order to stir the coolant and flush the oxygen located in proximity to the coolant.

2. The method of claim 1, further comprising isolating a make-up tank of coolant using a check valve to prevent coolant from spreading, the check valve closing after rapid movement of the coolant is detected.

3. The method of claim 1, further comprising detecting the triggering of a supply cell of the transformer using at least one triggering sensor, wherein the triggering sensor is capable of causing partial draining of the coolant and injection of inert gas.

4. The method of claim 1, further comprising detecting the temperature of coolant using at least one temperature sensor, wherein the temperature sensor is capable of causing partial draining of the coolant and injection of inert gas.

5. The method of claim 4, further comprising detecting the triggering of a supply cell of the transformer using at least one triggering sensor, wherein the triggering sensor is capable of causing partial draining of the coolant and injection of inert gas, and wherein partially draining the coolant is initiated only after the temperature sensors and the triggering sensors simultaneously order initiation of the partial drainage of the coolant.

6. The method of claim 1, further comprising detecting the presence of coolant vapour in the enclosure of the transformer using a vapour sensor, wherein the vapour sensor is capable of causing partial draining of the coolant and injection of inert gas.

7. The method of claim 6, further comprising detecting the temperature of coolant using at least one temperature sensor, wherein the temperature sensor is capable of causing partial draining of the coolant and injection of inert gas, and wherein partially draining the coolant is initiated only when the vapour sensor and the temperature sensor simultaneously cause initiation of the partial drainage of the coolant.

8. The method of claim 6, further comprising detecting the triggering of a supply cell of the transformer using at least one triggering sensor, wherein the triggering sensor is capable of causing partial draining of the coolant and injection of inert gas, and wherein partially draining the coolant is initiated only after the vapour sensor and the triggering sensor order initiation of the partial drainage of the coolant.

9. A device for protecting an electrical transformer against explosion and fire, the electrical transformer comprising an enclosure filled with a combustible coolant, comprising:

a means for sensing the pressure in the said enclosure;

a means for sensing vapour of the coolant in the enclosure; and a means for partially draining the coolant contained in the enclosure as a result of signals sent from the pressure-sensor means or as a result of signals sent from the vapour-sensor means.

10. The device of claim 9, further comprising:

a means for sensing a temperature of the coolant in the enclosure; and a means for sensing the triggering of a supply cell of the transformer.

11. The device of claim 9, wherein the pressure-sensor means comprises a safety valve equipped with an electrical contact.

12. The device of claim 9, further comprising a means for sensing the pressure in an on-load tap changer of the transformer and a means for setting the pressure of the on-load tap changer to atmospheric pressure.

13. The device of claim 9, further comprising a control unit which receives signals emitted by the sensor means of the transformer and can emit control signals.

14. The device of claim 13 wherein the means for draining the enclosure comprises a valve whose opening is initiated by a control signal from the control unit.

15. The device of claims 13, further comprising a means for cooling the hot parts of the coolant by injecting inert gas into the bottom of the enclosure.

16. The device of claim 15 wherein the means for injecting inert gas comprises a pressurized gas tank, a pressure reliever and a valve whose opening is ordered by a control signal from the control unit.

17. A device for protecting an electrical transformer against explosion and fire, the electrical transformer comprising an enclosure filled with a combustible coolant, comprising:

a pressure sensor system connected to sense a pressure in the enclosure;

a vapour sensor connected to sense coolant vapour in the enclosure; and a system for substantially immediately decompressing the coolant contained in the enclosure, said system for decompressing being triggered when a high-pressure condition is sensed by the pressure sensor system.

18. The device of claim 17, further comprising:

a temperature sensor for sensing coolant temperature in the enclosure; and a triggering sensor for sensing the triggering of a supply cell of the transformer.

19. The device of claim 17 wherein the pressure sensor system comprises a safety valve equipped with an electrical contact.

20. The device of claim 17, further comprising a control unit which receives signals emitted by the pressure sensor system and can emit control signals.

21. The device of claim 17, further comprising a pressure sensor system for sensing the pressure in an on-load tap changer of the transformer and a pressure setting system for setting a pressure of the on-load tap changer to atmospheric pressure.

22. The device of claim 17, further comprising a cooling system for cooling the hot parts of the coolant by injecting inert gas into the bottom of the enclosure.

23. The device of claim 22, further comprising an inert gas injection system for injecting inert gas, the inert gas injection system comprising a pressurized gas tank, a pressure reliever, and a valve whose opening is ordered by a control signal from the control unit.

24. A device for protecting an electrical transformer against explosion and fire, the electrical transformer comprising an enclosure filled with a combustible coolant, comprising:

a pressure sensor connected to sense the pressure in the enclosure;

a vapour sensor connected to sense coolant vapour in the enclosure;

a depressurization valve connected to decompress the coolant contained in the enclosure;

a control unit for receiving signals emitted by the pressure sensor and the vapour sensor;

wherein the depressurization valve is triggered when an increase in pressure is sensed by the pressure sensor or coolant vapour is sensed by the vapour sensor.

25. The device of claim 24, further comprising:

a temperature sensor for sensing coolant temperature in the enclosure; and a triggering sensor for sensing the triggering of a supply cell of the transformer.

26. The device of claim 24 wherein the pressure sensor comprises a safety valve equipped with an electrical contact.

27. The device of claim 24, further comprising an additional pressure sensor for sensing a pressure in an on-load tap changer of the transformer and a pressure setting system for setting the pressure of the on-load tap changer to atmospheric pressure.

28. The device of claim 24, further comprising a cooling system for cooling a potion of the coolant by injecting inert gas into the bottom of the enclosure.

29. The device of claim 28, wherein the cooling system comprises a pressurized gas tank, a pressure reliever, and a valve whose opening is ordered by a control signal from the control unit.

30. A method for protecting an electrical transformer against explosion and fire, the electrical transformer comprising an enclosure filled with a combustible coolant, comprising:

detecting presence of coolant vapour within the transformer using a vapour sensor;

decompressing the coolant in the enclosure using a depressurization valve, wherein the decompression is performed after detecting coolant vapour; and cooling the hot parts of the coolant by injecting a pressurized inert gas into a bottom of the enclosure to stir the coolant and flush out oxygen.

31. The method of claim 30, further comprising detecting the temperature of coolant using temperature sensors, and wherein partially draining the coolant is initiated only when the vapour sensor and the temperature sensors simultaneously order initiation of the partial drainage of the coolant.

32. A device for protecting an electrical transformer against explosion and fire, the electrical transformer comprising an enclosure filled with a combustible coolant, comprising:

a means for sensing the pressure in the enclosure;

a means for sensing coolant vapour in the enclosure;

a means for substantially immediately decompressing the coolant contained in the enclosure; and a control unit for receiving signals emitted by the pressure sensing means;

wherein said means for decompressing is triggered when a high-pressure condition is sensed by the pressure sensing means.

* * * * *